SLIDE VIEWER

Filed July 5, 1957

INVENTOR.
Karl M Maiershofer
BY:
Olson & Trexler attys

SLIDE VIEWER

Filed July 5, 1957

Inventor
Karl M. Maiershofer
By: Olson & Trexler attys.

July 5, 1960 K. M. MAIERSHOFER 2,943,409

SLIDE VIEWER

Filed July 5, 1957 3 Sheets-Sheet 3

INVENTOR.
Karl M. Maiershofer
BY
Olson & Trexler
attys.

United States Patent Office 2,943,409

Patented July 5, 1960

2,943,409

SLIDE VIEWER

Karl M. Maiershofer, Norridge, Ill., assignor to G-M Laboratories Inc., Chicago, Ill., a corporation of Illinois Filed July 5, 1957, Ser. No. 670,030

6 Claims. (Cl. 40—63)

This invention is concerned with a folding viewer for photographic slides and the like.

Foldable hand-held viewers for viewing photographic slides, particularly color slides, are in wide use. Such slides at one time were almost exclusively on 35 mm. film, the image or transparency being on the order of 1" x 1½", and the over-all slide, including the mount for the image or transparency, being 2" square. However, rather recently, the 2¼" x 2¼" film size has become very popular for making color transparencies. The over-all slide size is somewhat larger, being on the order of 2¾" square.

Obviously, a larger slide viewer is necessary for the 2¼" x 2¼" slides simply to accommodate the slides. In addition, a rather long focal length lens is necessary if distortion at the corners is to be avoided. Merely making the slide viewer foldable does not reduce the size sufficiently, since the long focal length lens requires a substantial spacing between the lens and the holder of the slides.

Accordingly, it is an object of this invention to provide a slide viewer having a compound folding action whereby to produce a compact folded article while presenting a relatively long focal length lens.

It is a further object of this invention to provide such a folding slide viewer wherein part of the folding action is automatic.

Yet another object of this invention is to provide a slide viewer accepting either 2¼" x 2¼" slides or 35 mm. slides.

Other and further objects and advantages of the present invention will be apparent from the following description when taken in connection with the accompanying drawings wherein.

Figures 1, 2, 3, 4, 5, 6, 7:
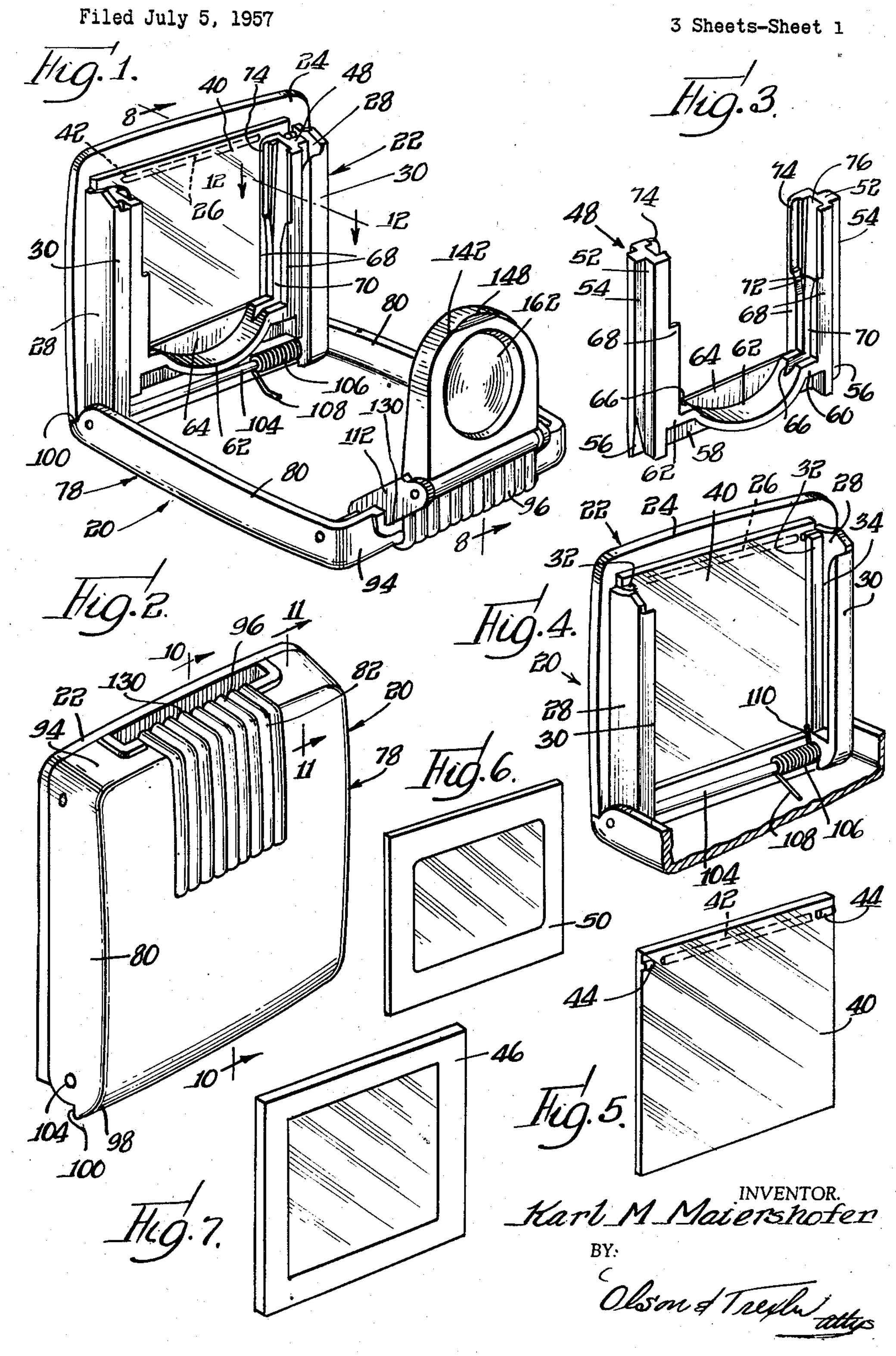
Fig. 1 is a perspective view of a slide viewer constructed in accordance with principles of this invention.
Fig. 2 is a perspective view of the viewer in folded position.
Fig. 3 is a perspective view of the insert for accommodating 35 mm. slides.
Fig. 4 is a fragmentary perspective view with the viewer in open position showing the viewer with the insert removed.
Fig. 5 is a perspective view of the light-diffusing screen.
Fig. 6 is a perspective view of a 35 mm. slide.
Fig. 7 is a perspective view of a 2¼" x 2¼" slide.

Referring now in greater particularity to the drawings, and first to Figs. 1, 2, 4, 8, and 9, there will be seen a slide viewer 20 constructed in accordance with the principles of this invention. The main parts of the slide viewer are molded of thermoplastic, but it is to be understood that other materials could be used. The slide viewer includes a body 22 designed to be used in substantially vertical position. The body comprises a generally flat rectangle 24 of the aforesaid thermoplastic material and has a square aperture 26 therein. The top and side edges of the rectangle 24 are slightly curved or bowed outward to present a pleasing appearance.

The body is provided with a pair of vertical, rearwardly extending flanges 28 spaced in slightly from the lateral edges of the body. The flames 28 are provided at their rear edges with right angle, inwardly directed flanges or posts 30 extending vertically, and also with intermediate flanges 32 parallel thereto. The upper ends of the flanges 30 and 32 are curved somewhat, as indicated in the drawings, to facilitate entry into the channels defined thereby. Specifically, the flanges 30 and 32 define relatively wide channels 34, while the flanges 32 coact with the front section 24 to define channels 36. At the bottom edge of the rectangular section 24, the body is provided with a rearwardly offset, and rearwardly curved flange 38 which serves to reinforce the lower portions of the side flanges 28, while providing proper clearance for association with other parts, as will be apparent hereinafter.

A translucent plastic light-diffusing screen 40 (see also Fig. 5) is inserted in the channels 36 immediately behind the aperture 26. This screen is flat and is generally rectangular. It is provided with a transverse bar or protuberance 42 on its outer face and slightly below the top edge. When the screen 40 is pushed down into the channels 36, the transverse bar 42 snaps into the opening or aperture 26 and holds the screen in position. A pair of nibs or protuberances 44 are provided along the lateral edges of the screen, substantially opposite to the bar 40, whereby to maintain the screen flat against the back of the section 24 with the bar 42 in the aperture.

The channels 34 are properly dimensioned, and properly spaced to receive the usual 2¼" x 2¼" slide, indicated at 46 in Fig. 7. An insert or adapter 48 (Figs. 1, 3, 8, and 9) is provided for holding the usual 2" square 35 mm. slides, indicated at 50 in Fig. 6, in place of the larger slides. The insert or adapter 48 comprises a pair of side walls or posts 52 having outwardly extending, longitudinal tongues 54 thereon. These tongues run substantially from top to bottom of the posts and are designed to be received slidably in the channels 34 whereby detachably to mount the insert or adapter in the body 22. The bottom ends of the tongues are tapered as at 56 to facilitate entrance of the tongues into the grooves or channels 34.

The posts 52 are connected at the bottom by a transverse wall 58 of rather limited height and of substantially half the thickness of the posts. Stub walls or flanges 60 extend toward one another from the posts along the top of the wall 58 for reinforcing the same, and are interconnected by an arcuate wall 62. This wall provides clearance for the lens assembly when the viewer is folded, as will be brought out hereinafter. It also is useful as a finger-positioning device for pushing the insert or adapter down into place. The upper portion of the wall as subtended by the arcuate wall 62 is of substantially thinner construction, as may be seen at 64 in the drawings. This thinning of the wall also provides clearance for the lens assembly. The top surfaces of the stub walls or flanges 60 are provided with horizontal V grooves 66 for supporting and positioning slides. As will be apparent, 35 mm. slides vary somewhat in thickness according to whether they are in cardboard mounts, or are bound in glass mounts. The V grooves centralize the slides irrespective of thickness.

The posts 52 further are provided with pairs of inwardly directed, generally confronting flanges 68 providing opposed channels 70 for receiving the 35 mm. slides. The flanges 68 are of limited extent, being substantially half the height of the posts, measured up from the stub flanges or walls 60. This facilitates insertion of the slides from the rear of the viewer, and the upper ends of the flanges 68 are tapered, as at 72, further to facilitate insertion of slides. Insertion of slides further is facilitated by a relatively thin flange 74, extending from the top of the flange 68 nearest to the diffusing screen 40, up to the top of the post 52, on each post. Furthermore, a tapered groove or channel 76 is formed in each post as an upward extension of the corresponding channel 70, whereby further to facilitate the insertion of slides.

As previously has been indicated, the insert or adapter is installed and removed simply by sliding the tongues 54 down into the grooves or channels 34. To facilitate such sliding motion, while insuring proper seating of the insert, the outer edges of the tongues preferably are not quite parallel. Specifically, the upper ends of the outer edges of the tongues are spaced apart slightly farther than the lower ends. Accordingly, the insert enters with somewhat of a wedging action. The resiliency of the plastic material allows any necessary deflection to facilitate insertion and removal, while resisting accidental withdrawal.

Figures 8, 9:
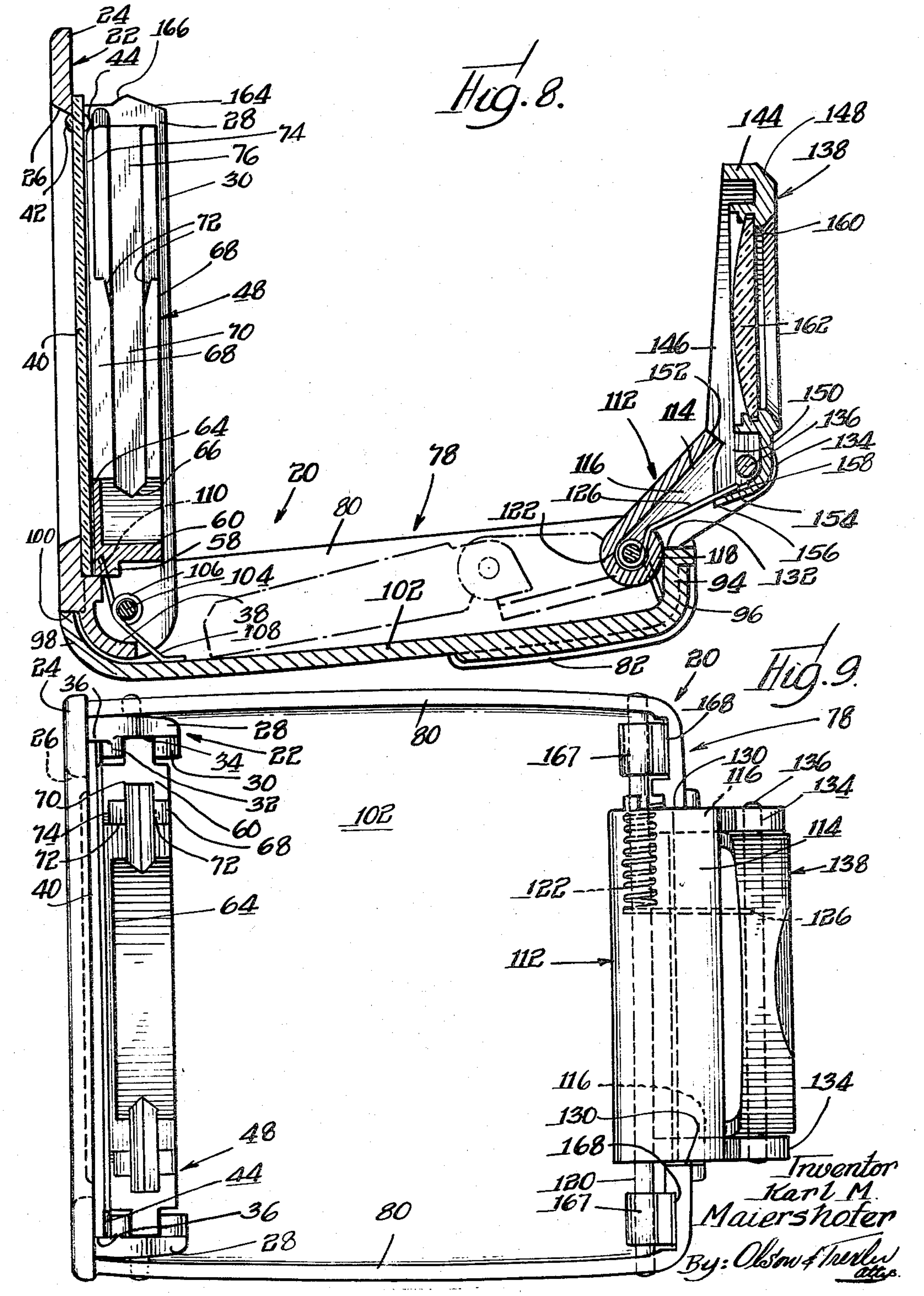
Fig. 8 is a longitudinal sectional view through the viewer in open position as taken along the line 8—8 in Fig. 1.
Fig. 9 is a top plan view of the open viewer.

The viewer also includes a cover 78. The cover is of generally square configuration, and is provided with upstanding side walls 80 with the viewer in the open position as shown in Figs. 1 and 8. These side walls are curved slightly to conform with the lateral edges of the body 22 when the unit is folded. Adjacent the rear end of the side wall, ornamental embossments 82 are provided and the embossments run up on to the rear end flange or wall 94 as at 96. The rear wall 94 is curved very slightly for ornamental appearance, generally similar to the side walls 80. At the front end of the cover, there is an arcuate upstanding flange or wall 98 terminated at substantially half the height of the side walls 80. These side walls 80 are terminated short of the extremity of the arcuate wall 98 whereby to provide a positive stop or shoulder 100 engageable with the bottom edge of the body 22 to limit its pivoted position, as will be brought out very shortly. The cover also includes a bottom or main wall 102 which is substantially straight across, but which is slightly convex from front to back for improved rigidity and ornamental appearance.

A pin 104 extends between the side walls 80 in the vicinity of the shoulders or stops 100 and passes through the posts 30, pivotally to mount the cover on the body. A helical spring 106 encircles the pin 104 near one end thereof, and the outwardly projecting arms 108 and 110 respectively engage the bottom wall 102 of the cover and the body adjacent the bottom of the aperture 26 therein. The spring thus urges the body toward upright position on the cover, as shown in Figs. 1 and 8. However, the cover and body are relatively pivotable toward one another, in which case the posts 30 fold inside of the side walls 80 of the cover, and the top edge of the body lies along the top of the rear wall 94 of the cover, the lateral edges of the body lying along the tops of the side walls 80.

Figures 10, 11, 12, 13, 14:
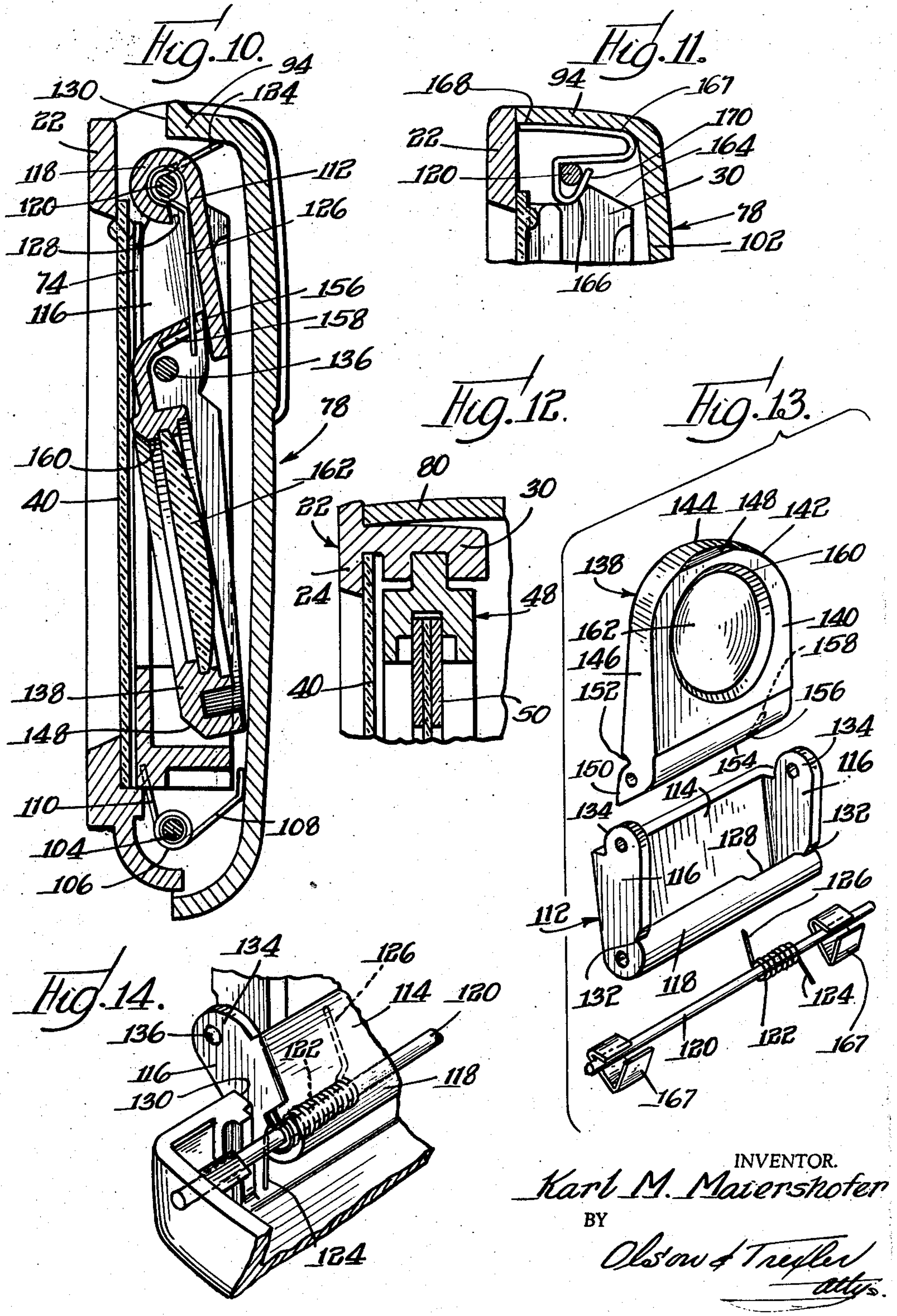
Fig. 10 is a longitudinal sectional view similar to Fig. 8, but with the viewer in folded position.
Fig. 11 is a detail sectional view showing the latching mechanism holding the viewer in closed position.
Fig. 12 is a fragmentary horizontal sectional view taken substantially along the line 12—12 in Fig. 1, and showing a 35 mm. slide as supported in the viewer.
Fig. 13 is an exploded perspective view of the lens-carrying parts.
Fig. 14 is a detail perspective view of the mounting of the lens-holding bracket.

At the rear of the cover 78 there is provided a lens-holder bracket 112. This bracket, as best seen in Figs. 8, 9, and 13, comprises a flat plate 114, and a pair of side flanges 116. A transverse tubular section 118 is formed along the bottom edge of the plate 114, and extends between the side flanges 116. A pin 120 extends through this tubular section, and has its outer ends fixed in the side walls 80 of the cover. A coil spring 122 encircles the pin 120, and is housed within the tubular section 118. One arm of the spring extends down against the rear or end wall 94 of the cover, as is indicated at 124. The other end 126 extends out through a cutout or opening 128 in the tubular section, and up along the rear side of the plate 114 for cooperation with another part, as will be set forth shortly hereinafter. The spring acts to rock the bracket 112 back into a relieved space or cutout 130 in the rear wall 94 adjacent the embossments 96. For this purpose, the side flanges 116 are relieved, and provided with shoulders 132 for bearing against the top of the wall 94 in the relieved area 130, whereby the lens-holder bracket is securely seated in a diagonal or oblique position, as best may be seen in Figs. 1, 8, 9, and 14.

The side flanges 116 are provided with extending ears 134, and a pin 136 is fixed in and extends between these ears. A lens holder 138 is pivotally mounted on the pin 136 between the ears 134. The lens holder includes a rear wall 140 of more or less rectangular configuration, but having the upper end rounded off as at 142 on a semicircular arc. A circumferential flange 144 lies about the arcuate top of the lens holder and extends into a pair of side flanges 146 lying along the sides of the lens holder, and projecting forwardly from the rear wall or plate 140. The junction of the rear wall 140 and the arcuate flange 144 is chamfered as at 148, along the upper portion thereof, whereby to cam the lens holder into proper position, under some conditions of folding the viewer.

The side flanges 146 are provided with extensions in the form of ears 150 receiving the pivot pin 136. The junctions between the ears 150 and the flanges 146 are relieved to provide stops or shoulders 152 which bear against the upper edge of the plate 114 to hold the lens holder in upright position with the lens-holder bracket in the oblique position, as described. A curved and then downwardly extending wall or flange 154 extends from the bottom edge of the wall or plate 140 and lies along the lower edges of the ears 150, and serves to reinforce the ears. In addition, this flange 154 is provided with an edge notch 156 (Figs. 8 and 13), and an interior groove 158. The upward extending end 126 of the spring 122 passes through the notch 156 into the groove 158, thus acting on the flange 154 to hold the lens holder in upright or extended position relative to the bracket 112. As will be apparent, the rear wall or plate 140 of the lens holder 138 is provided with a circular aperture 160 in which there is mounted a glass magnifying lens 162. This lens is centered with the diffusing screen 40, and with either a 2¼" x 2¼" slide or with a 35 mm. slide, and is parallel thereto.

In order to hold the slide viewer in the folded or collapsed position of Figs. 2 and 10, the upper ends of the posts 30 are provided with cam and latching edges 164 and 166, respectively, best seen in Fig. 11. Substantially V-shaped springs 167 (Figs. 9 and 11) are set into shallow recesses 168 at opposite ends of the rear wall 94 of the cover 78. These springs 167 have projecting and rearwardly bent tips 170 loosely surrounding the pin 120, and confronting the upper ends of the posts 30, particularly the cam surfaces 164 and the latch surfaces 166 with the slide viewer in folded position.

When the slide viewer is folded in the position shown in Figs. 2 and 10, and it is desired to open the viewer, it is a simple matter to insert one's fingers or thumbs in the clearance space provided by the recess 130. The cover and body then are moved away from each other, the latch surface 166 on each post camming past the corresponding spring end 170 of the springs 167. Once the springs 167 have been overcome, the spring 106 erects the body relative to the cover, while the spring 122 forces the lens-holder bracket 112 to its oblique rearward position, and simultaneously erects the lens holder 138.

When it is desired to refold the viewer, a substantially reverse procedure is followed. The lens holder and lens-holder bracket are folded to the dashed-line position of Fig. 8, and the body then is moved down to the cover, and the cam surfaces 164 are cammed past the spring ends 170, whereby the viewer is held in folded position. As has been noted, the arcuate upper end 142, 144 of the lens holder fits in adjacent the arcuate wall 62 when the parts are folded. If the parts are folded carelessly, there is a possibility of engagement of the lens holder with a part of the insert or adapter 48, and the chamfered surface 148 then causes the parts simply to cam past one another without damage.

One feature to be observed is that when the insert is in place, it is impossible for the lens holder and lens-holder bracket to rub against the diffusing screen 40. As is shown in Fig. 10, the side flanges 116 of the lens-holder bracket bear against the relatively thin flanges 74 of the insert or adapter, and thus prevent contact of the parts with the diffusing screen.

Many important features now will be evident, either from the written description or from the drawings, or both. For one thing, the lens 162 has a sufficiently long focal length to prevent distortion at the corners of the slides, and yet the folding, rearward projection of the lens-holder bracket allows the parts to be collapsed into a small enough package to fit in a shirt pocket. Thus, it will be apparent that the rearwardly extending movable or hinged part—specifically, the lens-holder bracket—is of considerable importance. It will be observed that the spring acting on the lens holder and lens-holder bracket serves a double function—namely, the function of forcing the lens-holder bracket into its rearward position, and the function of erecting the lens holder.

It will be seen that the dimensions of the lens holder are only slightly greater than those of the lens itself. These dimensions are substantially less than the dimensions of the body. Accordingly, even though a relatively large slide may be inserted for viewing, the lens holder and associated parts will fit close to the eye of the observer, being positioned alongside the nose, and not out in front of the nose.

It is well known that it is difficult to hold molded plastic articles to critical tolerances, and hence mere dimples or the like on plastic surfaces are often unreliable in holding parts in a desired position. Such unreliability in holding the present viewer closed is avoided by the use of the metal springs, which easily compensate for any slight variation in dimensions in the finished product.

It is to be understood that the specific embodiment of the invention as herein shown and described is for illustrative purposes only. Various changes in structure will no doubt occur to those skilled in the art, and are to be considered as forming a part of this invention insofar as they fall within the spirit and scope of the appended claims.

The invention is claimed as follows:

1. A collapsible slide viewer comprising a base, a light-diffusing screen, means supporting said light-diffusing screen and providing for supporting a slide in the vicinity of said screen, means pivotally mounting said supporting means on said base for pivotal movement between confronting folded position and erected position upstanding therefrom, a viewing lens, a holder for said lens, a bracket, means pivotally mounting said lens holder on said bracket, means pivotally mounting said bracket on said base, cooperating stop means on said bracket and said holder limiting said lens holder to an upstanding position relative to said bracket and parallel to said screen, said lens holder thus being in erected position, said lens holder being movable to folded position substantially parallel to and extending away from said bracket, means releasably holding said lens holder and bracket with said stop means in limiting position, said bracket and said base having cooperating stop means thereon, said stop means limiting said bracket in erected position with said bracket projecting rearwardly of said base and holding said lens holder rearwardly beyond the confines of said base, said bracket being pivotal in folded position into proximity with said base between said base and said screen, and means releasably holding said bracket in erected position with said stop means in engagement, the means releasably holding the lens holder in erected position and the means releasably holding the bracket in erected position comprising a single spring.

2. A collapsible slide viewer as set forth in claim 1 wherein the bracket is pivotally mounted on the base by means of a pivot pin, and wherein the spring comprises a helical spring encircling said pivot pin and having one arm engaging the base and having a second arm extending past the bracket and engaging the lens holder.

3. In a collapsible slide viewer of molded plastic comprising a base having a bottom and upstanding peripheral side walls thereon, a light-diffusing screen, means supporting said light-diffusing screen and providing for support of a slide to be viewed, means pivotally mounting said supporting means on said base between a pair of opposed side walls thereof for movement between confronting folded position lying at least in part within the confines of the side walls of the base and erected position substantially upright relative to said base, a lens, and means mounting said lens for movement between upright position relative to said base and folded position adjacent said base within the confines of the side walls thereof and between said supporting means and said base; the combination of a cam on a part of said supporting means lying within the confines of said side walls when in folded position and a generally U-shaped sheet metal clip secured against a side wall of said base and having a portion projecting outwardly and folded over rearwardly confronting said cam for releasably locking said supporting means in folded position.

4. The combination as set forth in claim 3 wherein the means mounting the lens is pivotally mounted on the base by means of a pivot pin extending between a pair of said upstanding side walls, and wherein there are two of the sheet metal clips and two confronting cams, the projecting and rearwardly bent portions of said clips lying about the pivot pin mounting the lens, said pivot pin limiting deflection of said sheet metal clips.

5. A collapsible slide viewer comprising a base, a light-diffusing screen, supporting means for said base and having channel means therein for supporting a relatively large slide adjacent said screen, means pivotally mounting said supporting means on said base for pivotal movement between confronting folded position and erected position upstanding therefrom, a generally U-shaped insert slidably received in said channels and having channels therein for receivnig a slide of smaller size, said insert having an arcuate wall at the bottom thereof, a viewing lens, a holder for said lens, said holder having an arcuate upper edge, means pivotally mounting said holder on said base for movement between erected position upright relative to said base and parallel to said screen, and folded position proximate to said base and between said base and said screen, the arcuate upper portion of said lens holder fitting in close proximity to the arcuate wall of said insert when said slide viewer is folded.

6. A collapsible slide viewer comprising a base, a light-diffusing screen, means supporting said light-diffusing screen and providing for supporting a slide in the vicinity of said screen, means pivotally mounting said supporting means on said base for pivotal movement between confronting folded position and erected position upstanding therefrom, a viewing lens, a holder for said lens, a bracket, means pivotally mounting said lens holder on said bracket, means pivotally mounting said bracket on said base, cooperating stop means on said bracket and said holder limiting said lens holder to an upstanding position relative to said bracket and parallel to said screen, said lens holder thus being in erected position, said lens holder being movable to folded position substantially parallel to and extending away from said bracket, means releasably holding said lens holder and bracket with said stop means in limiting position, said bracket and said base having cooperating stop means thereon, said stop means limiting said bracket in erected position with said bracket projecting rearwardly of said base and holding said lens holder rearwardly beyond the confines of said base, said bracket being pivotal in folded position into proximity with said base between said base and said screen, and means releasably holding said bracket in erected position with said stop means in engagement, the means releasably holding the bracket and the lens holder in erected position comprising spring means.

References Cited in the file of this patent

UNITED STATES PATENTS

| | | |
|---|---|---|
| 9,611 | Mascher | Mar. 8, 1853 |
| 270,296 | Foster | Jan. 9, 1883 |
| 1,957,716 | Koster | May 8, 1934 |
| 1,989,454 | Koster | Jan. 29, 1935 |
| 2,461,718 | Bruno | Feb. 15, 1949 |
| 2,615,366 | Rothweiler | Oct. 28, 1952 |

FOREIGN PATENTS

| | | |
|---|---|---|
| 173,849 | Great Britain | Jan. 5, 1922 |
| 751,660 | France | June 26, 1933 |
| 815,264 | Germany | Aug. 2, 1951 |